(No Model.) 11 Sheets—Sheet 2.

C. P. LADD.
MACHINE FOR MAKING HEDDLES FOR LOOMS.

No. 434,065. Patented Aug. 12, 1890.

Fig. 2

WITNESSES:
INVENTOR
BY
ATTORNEYS.

(No Model.) 11 Sheets—Sheet 3.
C. P. LADD.
MACHINE FOR MAKING HEDDLES FOR LOOMS.

No. 434,065. Patented Aug. 12, 1890.

Fig. 3

(No Model.) 11 Sheets—Sheet 4.
C. P. LADD.
MACHINE FOR MAKING HEDDLES FOR LOOMS.

No. 434,065. Patented Aug. 12, 1890.

Fig. 4.

(No Model.) 11 Sheets—Sheet 5.
C. P. LADD.
MACHINE FOR MAKING HEDDLES FOR LOOMS.

No. 434,065. Patented Aug. 12, 1890.

Fig. 7

(No Model.) 11 Sheets—Sheet 7.
C. P. LADD.
MACHINE FOR MAKING HEDDLES FOR LOOMS.

No. 434,065. Patented Aug. 12, 1890.

(No Model.)  11 Sheets—Sheet 8.

C. P. LADD.
MACHINE FOR MAKING HEDDLES FOR LOOMS.

No. 434,065. Patented Aug. 12, 1890.

(No Model.) 11 Sheets—Sheet 9.
C. P. LADD.
MACHINE FOR MAKING HEDDLES FOR LOOMS.

No. 434,065. Patented Aug. 12, 1890.

WITNESSES:
INVENTOR
ATTORNEYS.

(No Model.)
11 Sheets—Sheet 10.

C. P. LADD.
MACHINE FOR MAKING HEDDLES FOR LOOMS.

No. 434,065.  Patented Aug. 12, 1890.

WITNESSES:
INVENTOR
ATTORNEYS.

THE NORRIS PETERS CO., PHOTO-LITHO., WASHINGTON, D. C.

(No Model.) 11 Sheets—Sheet 11.
C. P. LADD.
MACHINE FOR MAKING HEDDLES FOR LOOMS.
No. 434,065. Patented Aug. 12, 1890.

UNITED STATES PATENT OFFICE.

CALVIN P. LADD, OF BOSTON, MASSACHUSETTS, ASSIGNOR, BY MESNE ASSIGNMENTS, TO THE NATIONAL LOOM HARNESS COMPANY, OF MAINE.

MACHINE FOR MAKING HEDDLES FOR LOOMS.

SPECIFICATION forming part of Letters Patent No. 434,065, dated August 12, 1890.

Application filed August 17, 1888. Serial No. 283,052. (No model.) Patented in England November 15, 1887, No. 15,654, and September 4, 1888, No. 12,755; in France November 17, 1887, No. 187,047, and September 6, 1888, No. 192,822; in Belgium November 21, 1887, No. 79,626, and September 7, 1888, No. 83,185; in Germany November 26, 1887, No. 44,743; in Italy September 19, 1888, No. 24,127, and in Austria-Hungary December 27, 1888, No. 37,527 and No. 58,029.

*To all whom it may concern:*

Be it known that I, CALVIN P. LADD, a citizen of the United States, and a resident of Boston, in the county of Suffolk and State of Massachusetts, have invented certain new and useful Improvements in Machines for Making Heddles for Looms, (for which I have obtained patents as follows: in Great Britain, No. 12,755, dated September 4, 1888, and No. 15,654, dated November 15, 1887; in France, No. 187,047, dated November 17, 1887, and No. 192,822, dated September 6, 1888; in Belgium, No. 79,626, dated November 21, 1887, and No. 83,185, dated September 7, 1888; in Germany, No. 44,743, dated November 26, 1887; in Italy, No. 24,127/420, dated September 19, 1888, and in Austria-Hungary, Nos. 37,527 and 58,029, dated December 27, 1888,) of which the following is a specification.

My present invention is intended to provide a machine for use in the manufacture of heddles having the characteristics of that described and claimed in the Letters Patent for improvement in heddles granted to Calvin P. Ladd and William Muir July 16, 1889, and numbered 407,078. The said heddle as presented in said patent consists, essentially, of a pair of heddle-bars, which are grooved along their outer edges for the reception of ropes or other yielding cushions, one of which is placed in the groove in each bar, and of continuous wires secured at their ends to the opposite ends of the bars and passing alternately around the bars and the cushions thereon and through holes in the opposite ends of the heddle-eyes.

My invention consists in the construction and combinations of parts, as hereinafter described, and pointed out in the claims at the end of this specification.

In the accompanying drawings, forming a part of this specification.

In the drawings, A is the machine-frame. $B^9$ is the main or driving shaft mounted thereon, and $B^{97}$ are the driving and loose pulleys on said shaft.

Figure 3:
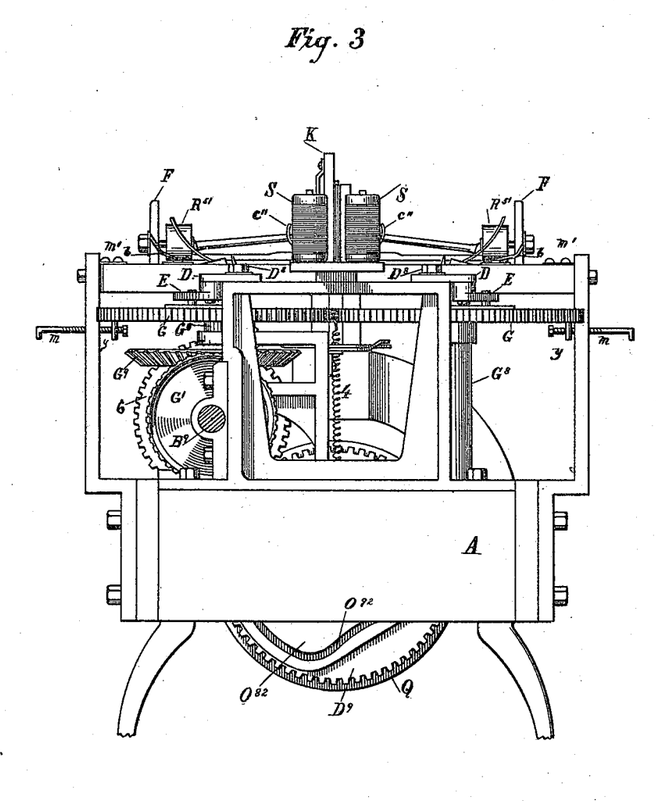
Fig. 3 is a view looking at the left-hand end in Figs. 1 and 2, with the driving and loose pulleys removed and shaft $B^9$ in section.
Figure 4:
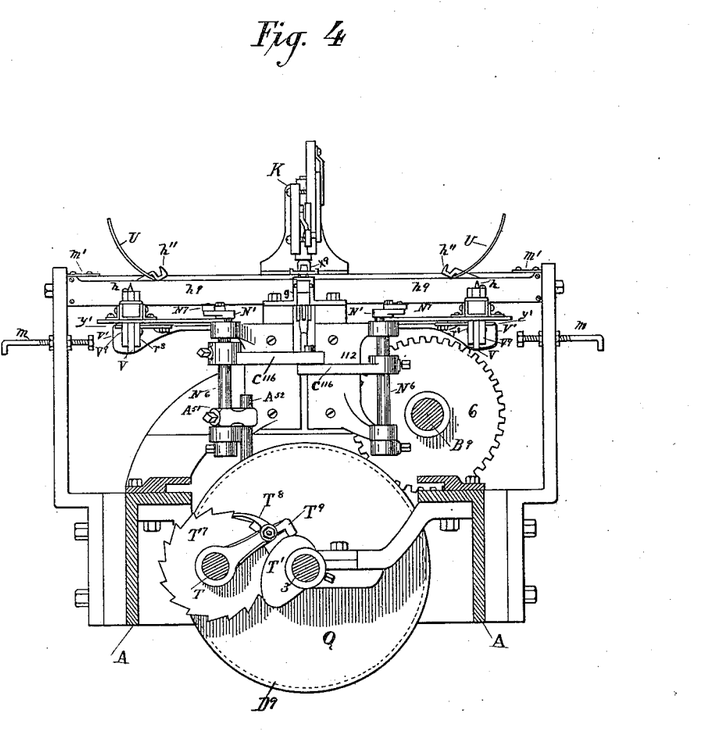
Fig. 4 is a view in transverse section, taken on the line $a\ a$ of Fig. 2, the machine being viewed from the right hand in Figs. 1 and 2.

6, Figs. 3 and 4, is a gear-wheel on the inner end of shaft $B^9$, in engagement with a gear $D^9$, mounted on the cam-shaft 3, which carries the cams Q and T', hereinafter referred to. A bevel gear-wheel G' on shaft $B^9$ meshes with a bevel-wheel $G^9$ on a short vertical shaft $G^8$, which carries also a large gear G, meshing with and driving a similar wheel, also lettered G, on a corresponding shaft $G^8$ on the opposite side of the middle line of the machine.

The foregoing constitute the main features of the driving-gearing of the machine.

Figure 1:
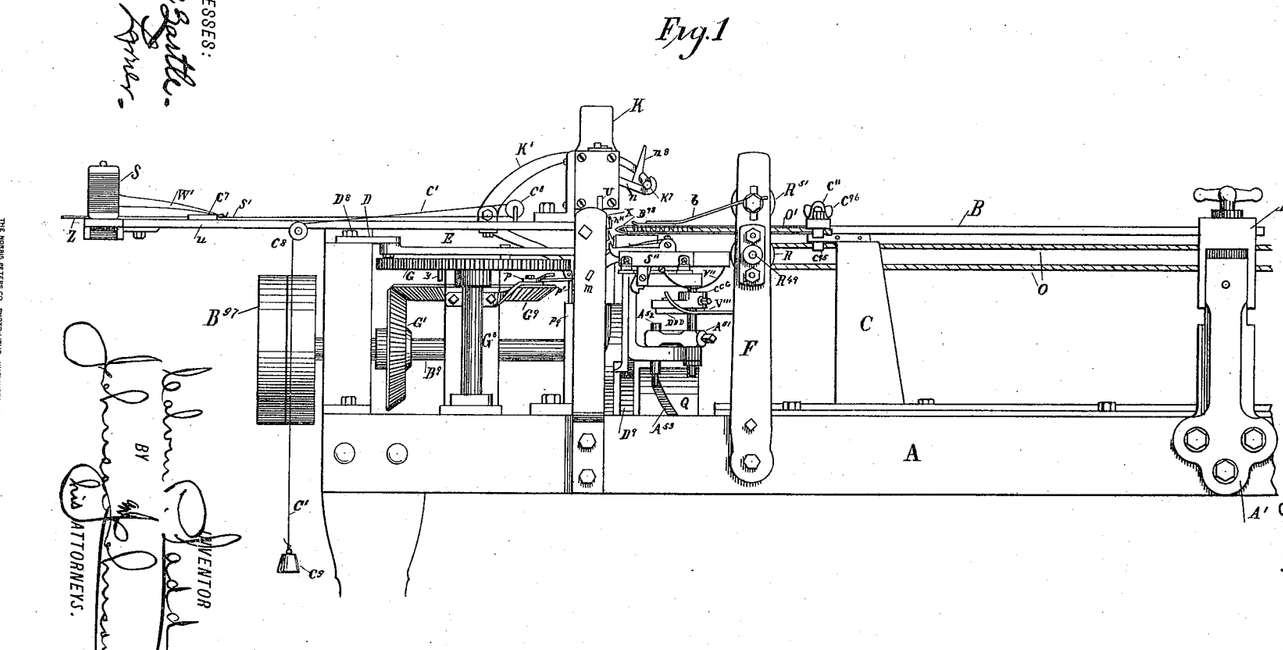
Figure 1 is a side elevation of a machine embodying my invention, one end of the machine being broken off.
Figure 2:
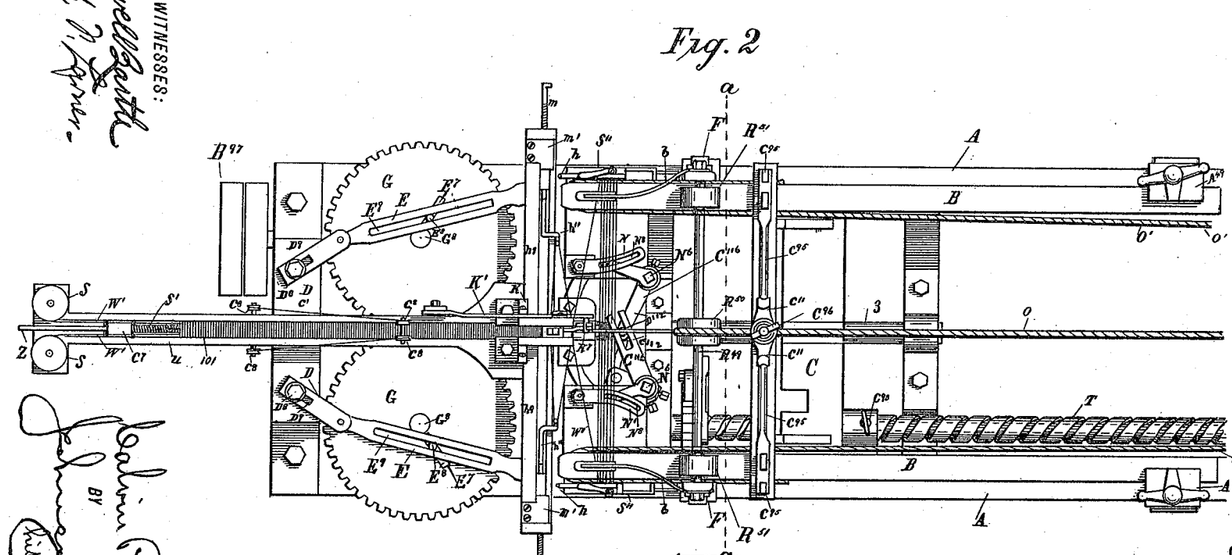
Fig. 2 is a corresponding plan view.
Figure 11:
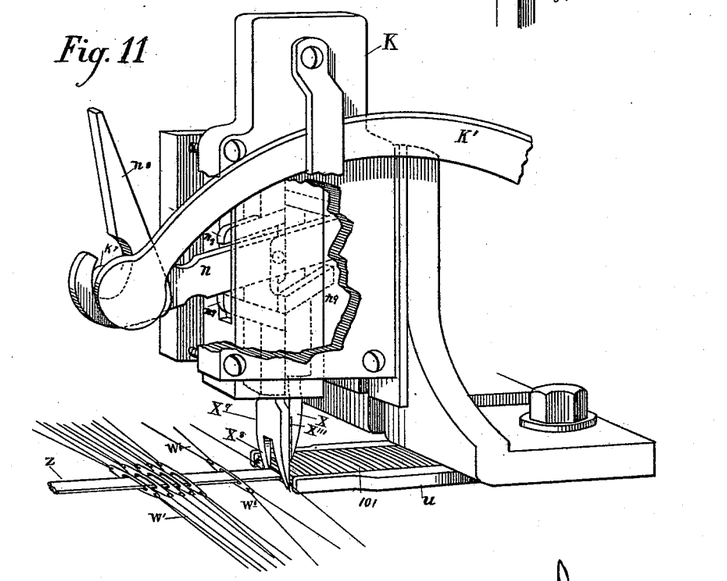

Before being placed in the machine the heddle-eyes 101, Fig. 2, are slipped upon a rod $z$, the latter passing through the openings or holes in the eyes which are intended for the passage of the warp-threads, and a sufficient number of the eyes are strung on the rod for a complete heddle or harness. Of course it will be understood that the rod may be made long enough and a sufficient number of eyes may be placed thereon to form two or more heddles or harnesses. Through the holes in the ends of the eyes of the series are drawn at the outset wires W' W', taken from spools S S. The rod Z, loaded with eyes, as described, is placed upon a bar $u$, extending longitudinally or otherwise of the machine and projecting at one end thereof, the said rod and the eyes thereon fitting in a groove, Fig. 2, in the upper side of the bar. The said groove forms a recessed way, along which the heddle-eyes are caused to slide by the action of weights $C^9$, hung to cords $C'$, which pass around suitable guide-pulleys $C^8$ $C^8$, and are connected to a block $C^7$, Figs. 1 and 2, threaded upon the rod Z and sliding in the groove of the bar $u$. I find it convenient to employ a spring $S'$, interposed between the block $C^7$ and the heddle-eyes, this spring tending to prevent shock and to secure greater ease of working. The spools S S are mounted on pins or spindles on the outer end of bar $u$, as shown. At the inner end of the bar $u$ is a small vertical bracket-frame K, (see detail view, Fig. 11,) within which are placed the separator X for the heddle-eyes and front stop $X^9$, which fit closely together, there being, however, a space $X'''$ between them at their lower ends just equal to the thickness of one of the heddle-eyes upon the rod Z. The lower end of the front stop is forked to straddle the rod Z, and the said separator and front stop are each formed with an inclined or beveled surface $X^8$. On the upper parts of the separator and front stop are lugs or projections $n^9$ $n^9$, between which play a lever $n$, which is pivoted on an axis intermediate the points at which it contacts with the lugs $n^9$ $n^9$, so that when the said lever is rocked on the said axis the separator X and front stop $X^9$ will be moved in opposite directions, the one ascending as the other descends, and vice versa. The forwardly-projecting end of the lever $n$ is upturned, as shown, and carries a horn $n^8$, the inner surface of which is cam-shaped, as shown. A pin $K^7$ is placed between the said horn and the upturned end of the lever, said pin being mounted on one end of the lever $K'$, the opposite end of which is connected by a link $p'$, Fig. 1, to a slide $p^9$, having a pin or roller thereon playing in an irregular groove or slot $O^{92}$, Fig. 3, in a disk $O^{82}$, mounted on the shaft 3.

Inasmuch as the devices described move the end of lever $K'$, carrying the pin $K^7$ through so extensive an arc that too great an extent of movement would be communicated to the lever $u$ and the separator and front stop were this not provided against, I construct the lever $n$ with the upturned end and the horn. As the pin $K^7$ rises it first contacts with the inner surface of the horn and raises the forward end of the lever $n$, thereby raising front stop $X^9$ and depressing separator X until the said pin escapes through the opening between the horn and the upturned end of the lever $n$, when the pin leaves the lever and continues its upward movement, the lever $n$ remaining stationary until the pin $K^7$, in its downward sweep, passes in between the horn and the upturned end of the lever and contacts with the end of the lever, when the forward end of the lever $n$ is depressed, depressing the front stop $X^9$ and raising the separator X. The separator and front stop and their actuating devices are so proportioned that as each rises the other will be depressed sufficiently to engage and hold the heddle-eyes as they are pressed forward under the influence of the weights $C^9$, Figs. 1 and 7.

In operation, the separator X having been raised, the heddle-eyes move forward until the first one is pressed against the rear side of the front stop $X^9$. As the separator X descends its point will pass between the first and second heddle-eyes. In this descent the incline on the rear side of the separator forces back slightly the remaining heddle-eyes. The ascent of the front stop will leave the first heddle-eye free to be drawn forward in the machine.

Into the space opened between the first and second heddle-eyes I cause to be introduced on each side of the rod Z a hook $h''$, Fig. 7, which is designed to engage with one of the wires $W'$ and to draw the same out toward the side of the machine in the form of a loop, all as will hereinafter be described. The hooks $h''$ might be caused to enter at once into the space as formed by the operations described. However, I find it expedient, in order to reduce the amount of movement communicated to the collection of the heddle-eyes mounted on the bar $u$, as well as to enable me to lessen the angle of the inclined portion of the separator and to produce at the same time between the first and second heddle-eyes an opening large enough to permit the introduction of a hook of sufficient size and strength, to employ, in connection with the separator X, a second separator or withdrawing device constructed and operated as in the manner which will be now described.

Figure 10:
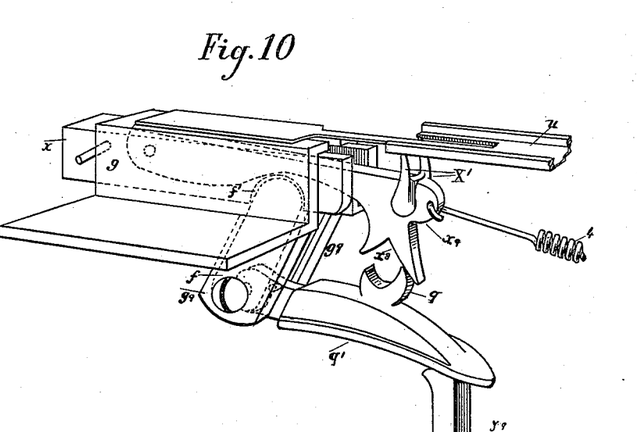
Figure 12:
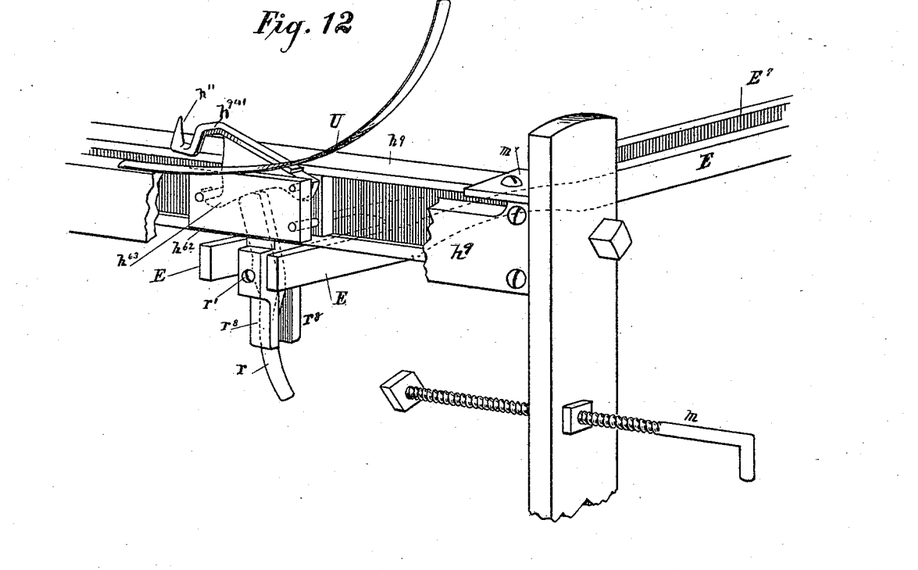
Figure 17:
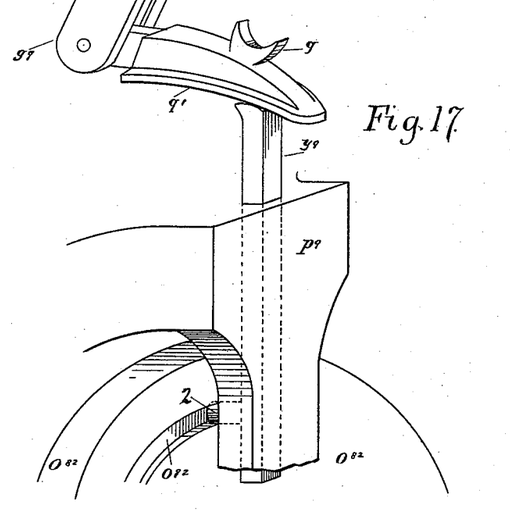

Beneath the free end of the bar $u$ is the case $g$, (see Fig. 10,) within which and free to slide longitudinally therein is the bar $x$, at one end of which is pivoted the plate $x^9$, on the upper side of which, near the free end thereof, are mounted two pins or hooks $X'$ $X'$, this plate and its pins or hooks constituting what I term the "second" or "under" separator. The pins play in slots in the bar $u$, which is reduced in width in front of the said slots, and the middle part of said bar being straddled by the forked ends of the upper separator and front stop. To the free end of the plate $x^9$ is fastened one end of a spring 4, tending to draw the under separator toward the upper separator. Pivoted to arms $g^9$ of case $g$ is a bell-crank $q'$, the horizontal arm of which rests upon the upper end of a vertically-moving slide $y^9$, which carries a pin 2, Fig. 17, working in the cam-groove $O^{92}$ in the face of the disk $O^{82}$ on the shaft 3. The said horizontal arm is provided with a spur $q$ on its upper side, which spur as the said arm is raised enters the recess $x^8$ in the under side of the plate $x^9$, and imparts an upward movement thereto and to the pins or hooks $X'$ $X'$, raising them behind the first heddle-eye. The pins or hooks $X'$ $X'$ in moving upward travel in the same vertical plane with the upper separator X, the said pins passing outside of or straddling the lower end of the said upper separator. The vertical arm $f$ of the bellcrank $q'$ plays in a slot $f'$ in the bar $x$, and when the under separator has been raised to place its hooks or pins behind the first heddle-eye this arm comes in contact with the end of the slot and moves the said bar and under separator forward, carrying the first heddle-eye with them and withdrawing the said eye from the immediate neighborhood of the front stop and upper separator. When slide $y^9$ descends, the under separator is drawn down and rearwardly in the machine by the spring 4. It is to be understood that before starting the free ends of the wires $W'$ $W'$ are knotted or otherwise made fast, so that they will not pass through the holes of the first heddle-eye. While the under separator still remains elevated and in engagement with the first heddle-eye the portions of the wires $W'$ $W'$ extending between the first and second heddle-eyes are now engaged by the hooks $h''$ $h''$ and are drawn out in the form of loops to the sides of the machine, as shown in Fig. 7. These hooks (see Fig. 12) are pivoted on blocks $h^{62}$ or slides moving between bars $h^9$ $h^9$ on ways formed by shoulders on the inner sides of the said bars. The under side of each hook has a cam-shaped portion $h^{63}$, and to lugs $r^8$, projecting downwardly from the slides or blocks $h^{62}$, is pivoted a lever $r$, upon the upper end of which the cam-shaped under side of the hook $h''$ rests normally. The screw $r'$, which serves as the pivot for lever $r$, is turned up to such an extent as to cause the lugs $r^8$ to bind slightly against the sides of the lever $r$, and thereby cause the lever to move stiffly on its pivot, in order that after the hook has become engaged with the wire $W'$ the strain on the latter in the outward movement of the hook may not operate to depress the hook and free the wire.

Figure 13:
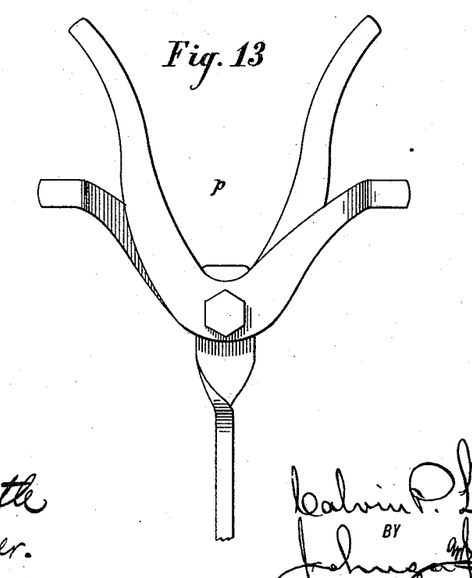

A reciprocating movement is imparted to the slides carrying the hooks $h''$ to carry the latter after they have engaged the wires $W'$ $W'$ outward to the sides of the machine and then move them inward to the bar $u$ again by means of the levers E E, (see Fig. 2,) which are slotted at their free ends to receive the lugs $r^8$ $r^8$ (see Fig. 12) and pivoted at their opposite ends to brackets D D, (see Fig. 2,) each of which is slotted at $D^9$ and secured adjustably to the machine frame-work by a screw $D^8$. Each lever E has a slot $E^9$, in which plays a crank-pin $E^8$, adjustably secured in the slot $E^7$ of one of the gear-wheels G. When the slides have been moved inward by the devices described, the levers $r$ are turned to raise the hooks $h''$ into engagement with the wires $W'$ $W'$ by means of horizontal levers $p$, (shown separately in Fig. 13,) whose free ends are placed in position to engage the said levers $r$, the levers $p$ being acted upon at the proper time by pins $y$ on the under sides of the wheels G G, as shown in Fig. 1. When the slides have been carried to the outward extremes of their movement, the lower ends of the levers $r$ come in contact with adjustable stops $m$, Fig. 7, (herein shown as screw-threaded rods passing through the machine-frame,) and are thereby moved to release the hooks $h''$, which are then depressed by plates $m'$, under which the said hooks pass. The engagement of the levers $r$ with the stops $m$ is provided for, in order that there may be nothing to resist the downward movement of the hooks, and the object of depressing the hooks is to place the two sides of each loop of wire in such a position that one side will readily pass beneath the side bar B, hereinafter referred to. Each loop is now engaged near the bight thereof by a side hook $h$ (see Fig. 7) and drawn over toward the point of the side bar B, and at the same time the main hook $h''$, beginning to move inward, is raised as soon as it passes from under the plate $m'$ by the flat spring U, Fig. 12, secured to one of the bars $h^9$, bearing against the portion $h^{41}$ of the stem of the hook, and one side of the loop of wire is thereby lifted above and over the point of the side bar B, the main hook as it moves inward quitting the loop and leaving it free to be drawn laterally upon the side bar by the hook $h$. During the outward movement of the hooks $h''$ $h''$ toward the sides of the machine the heddle-eye which has been separated from the rest is held in due alignment by the rod Z, and prevented thereby from being drawn to either side of the middle of the machine by inequalities in the strain upon the two wires $W'$ $W'$.

Figures 8, 9:
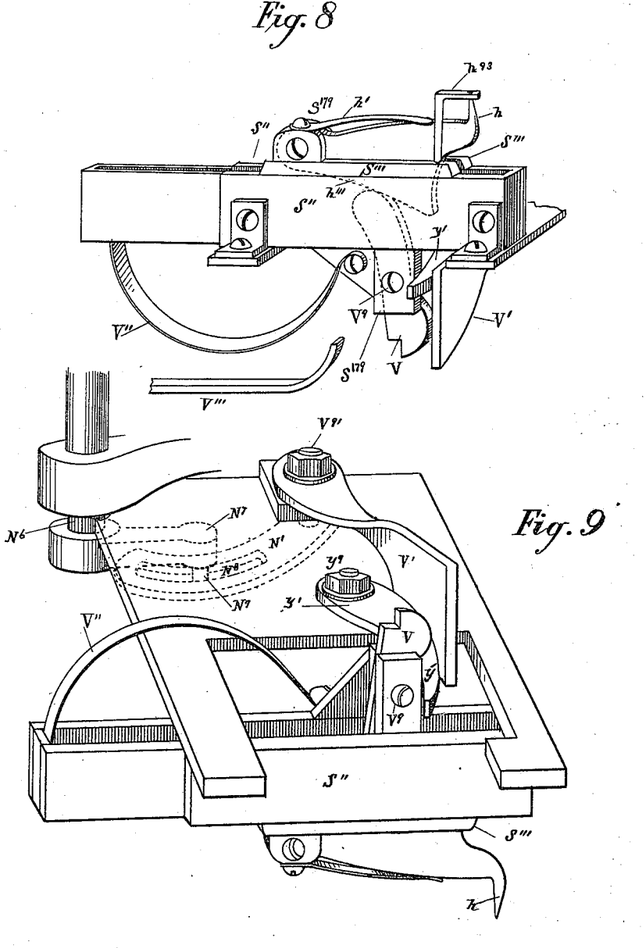
Figs. 8, 9, 10, 11, 12, 13, 14, 15, 16, and 17 are views of details.

The hooks $h$ are arranged on opposite sides of the machine and move in a direction at right angles to the direction in which the main hooks $h''$ move and parallel with the side bars B B, upon which latter the loops or leashes for connecting the heddle-eyes to the shafts of the heddle or harness-frame are drawn as fast as they are made by the action of the main hooks $h''$. Each hook $h$ (see Fig. 8) is pivoted at one end between lugs $S^{179}$ on the slide $S'''$, which is formed, as shown, with a horizontal upper portion that rests upon the upper side of the slotted case $S''$ and with a downwardly-projecting body extending through the case and beneath the same. A spring $h'$, fastened to the slide $S'''$, bears at its free end upon the hook $h$, with a tendency to depress the same. The hook $h$ on its under edge is formed with a cam-surface $h'''$, which rests upon the upper end of a lever V, pivoted in the body of the slide $S'''$ and projecting at its lower end beyond the same. The pivot of the lever V is a screw $V^9$, passing through lugs formed on the two sides of the body of the slide $S'''$, and by means of this screw the lugs may be drawn together, so as to bind against the lever and cause it to move stiffly. The slide $S'''$ is pressed rearwardly, so as to carry the hooks $h$ to a point adjacent to the hook $h''$ by means of a spring $V''$, composed of a bent flat strip of steel secured at one end to the machine-framing and connected at the opposite end thereof with the slide S'''. As the slide is moved rearwardly under the action of the spring V'', the lower end of the lever V is carried against the arm V', and the lever is thereby turned on its pivot, so that the upper end thereof, acting against the surface on the under side of the hook $h$, raises the said hook into engagement with the loop of wire. Intermediate the slide S''' and the arm V' is an arm $y'$, pivoted to the machine-framing at $y^9$, (see Fig. 9,) which shows in inverted position some of the parts on the side of the machine opposite to that shown in Fig. 8. The said arm V' is mounted on a vertical shaft $v^{91}$, which carries an arm N', formed with a curved slot $N^8$, in which plays a pin or stud $N^9$ on the end of an arm $N^7$ at the upper end of a vertical shaft $N^6$. (See Figs. 2 and 4.) Each of the shafts $N^6$ has also an arm $C^{116}$, one of the said arms being formed with a slot $C^{112}$, while the other carries a pin $D^{112}$, playing in the said slot. This construction causes the said shafts $N^6 N^6$ to move simultaneously in opposite directions.

Figure 14:
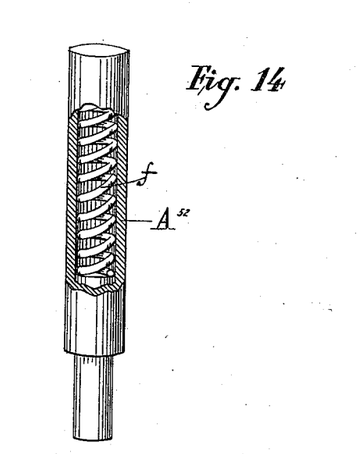
Figure 15:
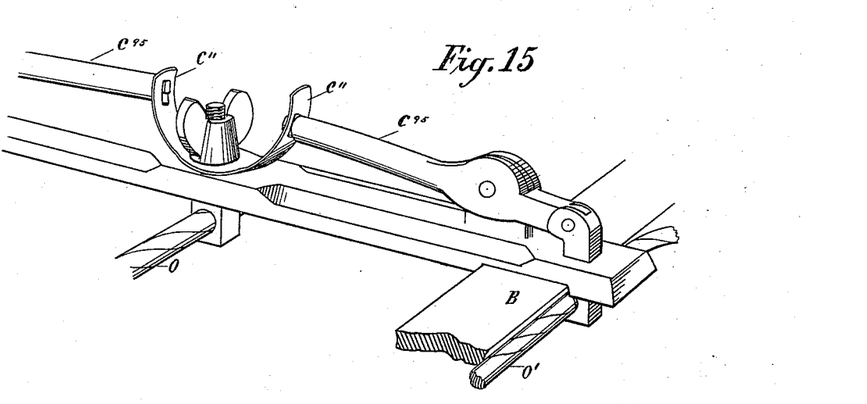

One of the shafts $N^6$ carries a third arm $A^{51}$, provided with a pin $A^{52}$, working in the cam-groove $A^{53}$, Fig. 1, of the hub Q on the shaft 3. The pin engages the cam-groove at one side of a vertical line passing through the axis of the hub Q and its shaft. In order, therefore, that the said pin may not bind in the groove as the arm swings, the pin is made vertically movable through the arm $A^{51}$, and is held down into the groove by a spring $f$, contained in pin $A^{52}$, Fig. 14. As the arms V' V' are caused to swing forward, each of them presses against the rear side of the adjacent arm $y'$, bearing said arm $y'$ against the rear sides of lugs on their sides, and thereby moves the slide S''' and its hook $h$ and the loop of wire engaged by the latter forwardly, so as to carry the said loop over the end of the adjacent side bar B. The arm $y'$ enables me to impart to the slide S''' a greater extent of movement than could be derived from the movement of the arm V' alone, the said arm acting as an intermediate lever, which extends the throw of the arm V'. Moreover, into the space which is maintained by the side arm $y'$ between the arm V' and the slide S''' the lower lever V extends free from contact with the arm V'. When in the forward movement of the slide the hook $h$ has drawn the loop of wire a sufficient distance over the end or point of bar B, the lower end of the lever V is carried into contact with a stop V''', and the lever is thereby turned on the screw $V^9$, so as to permit the hook $h$ to drop and release the loop of wire. The object of employing the screw $V^9$ for the pivot of the lever V and of turning up the said screw so as to cause the lugs to bind against the said lever is to prevent any pressure or strain on the hook $h$ or any jar or slight touch from acting to produce an undesired movement of the lever V and a resulting depression of the hook.

In describing the parts so far I have set forth the operations whereby the first heddle-eye is separated from the others on the rod Z and drawn forward in the machine, and whereby the wires W' W' between the first and second eyes are drawn out to the sides of the machine and passed over the side bars B B. The operation in separating each of the succeeding eyes and forming the successive loops or leashes by which they are to be connected to the side bars or shafts will be merely repetitions of those described. It will be understood that any slack existing in the loops drawn out between the first and second eyes and passed around the bars B B will be taken up while the loops between the second and third eyes are being formed.

Figure 7:
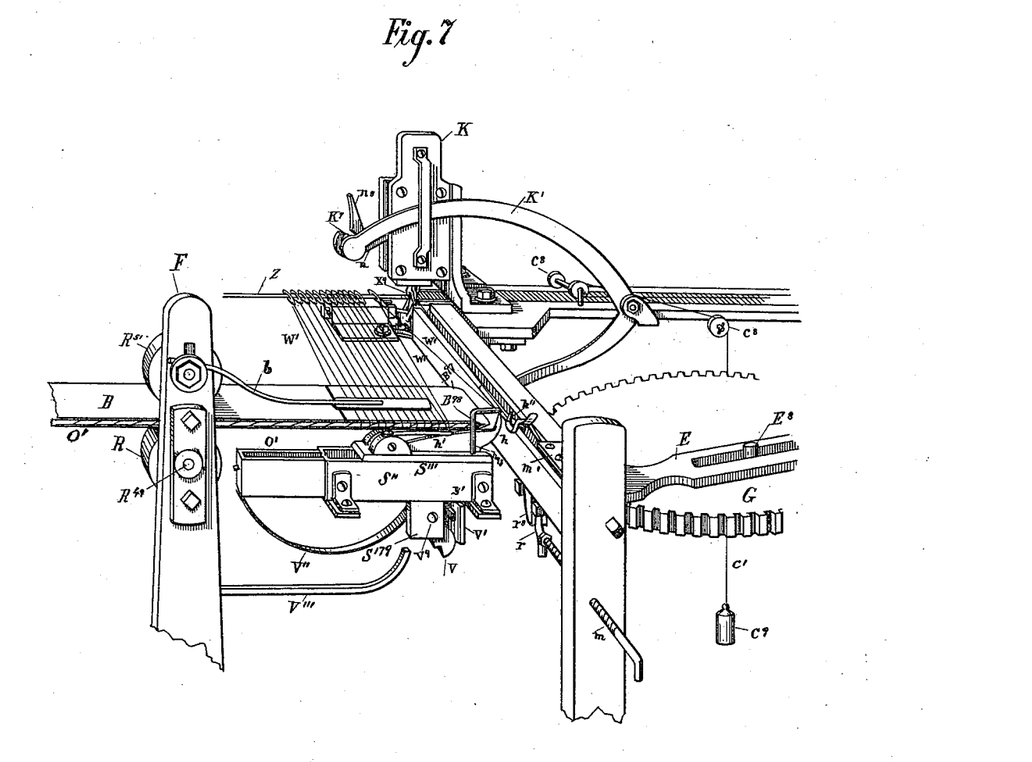
Fig. 7 is a view in perspective of some of the parts near the middle of the machine, looked at from the side opposite that visible in Fig. 1.

$b$ $b$, Figs. 1, 2, and 7, are springs secured to the standards F F and having flattened strips soldered to their free ends resting upon the loops or leashes of wire that have been strung upon the side bars. As the side hooks $h$ $h$ draw the loops around, the side bars B B they also serve to carry the upper sides of the loops under the springs $b$ $b$, whereby the loops are held in place.

Figure 16:
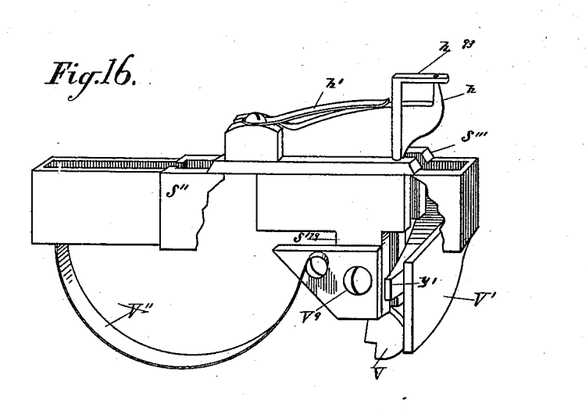

$h^{93}$ is a bent guard carried by the slide S''' and extended rearward into position for its end to be pressed against by the point of hook $h$ to prevent the loop of wire from becoming disengaged from the said point. I have found this guard useful only when the wires W' W' are highly tempered. (See Figs. 7 and 16.)

The side bars B are held by clamps $A^{49}$, Figs. 1, 2, and 7, mounted upon posts A', and the said bars near the ends upon which the loops of wire or leashes are slipped rest upon rollers R R, mounted upon a shaft $R^{49}$, journaled in the standards F F. If desired, additional rollers $R^{51}$ may be arranged above the side bars B B, as shown, to hold them down in place. These top rollers are useful only when the side bars B B are of wood, which is the case when the said bars are intended to form the side bars or shafts of the heddle or harness-frame. I find it desirable, however, not to employ wooden side bars, but instead to employ steel or iron bars, upon which the heddles are formed and from which they are subsequently removed and applied to the wooden side bars or shafts of the harness-frame. When metal side bars are employed in the machine, the upper rollers $R^{51}$ become wholly unnecessary and may be removed. When metal side bars are used, the rear ends thereof are thinned or tapered off to a blunt edge and the corners thereof are rounded off, this construction providing for the ready entrance of the said ends into the loops of wire as the latter are formed. When wooden side bars are used, I fit upon the ends thereof metallic caps or end pieces $B^{97}$.

In the end of the metallic bar, or in the end of the cap-piece $B^{97}$ when the latter is employed, is a perforation $B^{98}$, Fig. 7, extending from the inner edge to the outer edge of the bar or cap. In lieu of this opening $B^{98}$, I may form as an equivalent thereof a groove in the extreme end of the bar B, or of the cap when the latter is employed.

Figure 5:
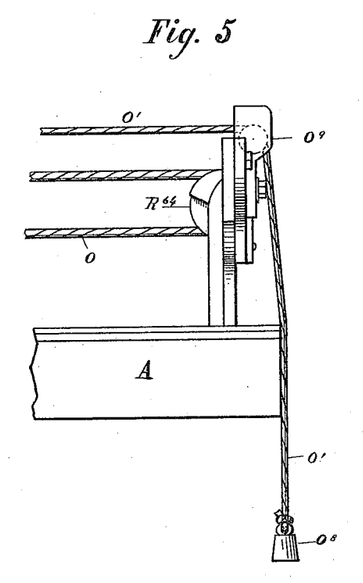
Fig. 5 is a view in side elevation of the portion of the end of the machine which is omitted from Figs. 1 and 2.
Figure 6:
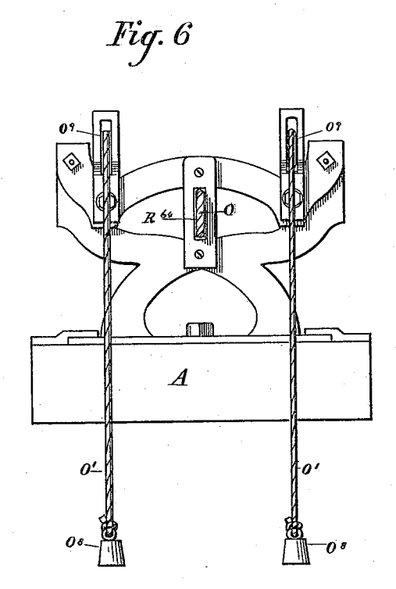
Fig. 6 is a view in end elevation of the said portion.

Along the outer edge of the metal bar from the opening $B^{98}$ or equivalent groove to the front end thereof, or along the edge of the wooden bar and the cap from the opening $B^{98}$ or equivalent groove therein when the said wooden bar and cap are employed, extends a groove. Through the opening $B^{98}$ or around the end of the bar or cap in the equivalent groove passes a rope O', one end of which extends forwardly over guides $O^9$, Figs. 5 and 6, and has suspended thereby a weight $O^8$, for the purpose of keeping the rope under proper tension. If desired, the weight may be replaced by a suitable spring. The end of the rope which passes to the outside of the bar is connected to a carriage C, having a screw or pin $C^{98}$, Fig. 2, which engages the threaded portion of the screw-shaft T. A cam T', Fig. 4, on the shaft 3 acts upon a lever $T^9$, fitted to rock loosely on the shaft T and carrying a pawl $T^8$ in engagement with a ratchet $T^7$, fast on the screw-shaft T. The rotation of the screw-shaft T traverses the carriage C slowly toward the front end of the machine, drawing the ropes O' through the openings $B^{98}$ or equivalent grooves and along the outer edges of the side bars, so as to present fresh portions of the ropes to receive the loops or leashes as they are formed and drawn around the bars. Around the pulley $R^{50}$ upon the shaft $R^{49}$ and a corresponding pulley $R^{64}$, Figs. 5 and 6, at the forward end of the machine passes an endless band or cord O, which is fastened at some point thereof to the carriage C. Thereby as the carriage is advanced the rollers or pulleys R are rotated, in order that the loops of wire passing around the side bars may not become displaced by contact with the said rollers. The forward end of rod Z is clamped to carriage C by a screw $C^{96}$, Fig. 1, and the ends of ropes O' O' are also clamped to the carriage by clamping-levers $C^{95}$ $C^{95}$, the inner ends of which when raised enter holes in latching-springs C'' C'', affixed to the carriage.

The operation of the various parts having been fully pointed out in the description of the construction of the machine, it will be unnecessary herein to repeat the same. It appears sufficient to state that after a sufficient number of loops or leashes extending from the heddle-eyes to and around the side bars and the ropes O' O' have been formed the machine is stopped, the wires cut in front of the upper separator and front stop, the clamps are removed, the forward end of rod Z is freed from carriage C and drawn back through the heddle-eyes to the point of separating, the ends of ropes O' O' are detached from the carriage C, and the said ropes are then cut at the extreme rear ends of the side bars. The side bars, with the loops thereon, and connected heddle-eyes are then removed from the machine and employed in the construction of the harness, as will be obvious from inspection of the patent referred to at the beginning of this specification. In restarting, carriage C is moved rearwardly to the rollers R $R^{51}$. Rod Z is then clamped thereto, the ends of ropes O' O' are clamped to the carriage, and the ends of wires W' W' are knotted in front of the openings in the ends of the first heddle-eye. In order to provide for the ready return of carriage C to its rearmost position, the screw or pin $C^{98}$ thereon, engaging in the thread of screw-shaft T, is withdrawn, when the carriage may be slid freely along the shaft. In case only a sufficient number of heddle-eyes to form the heddles of one harness-frame are placed on rod Z, the stoppage of the machine is not effected until after said eyes have all passed the separator and front stop, and then the said rod is removed from the machine and additional eyes are strung thereon.

I have herein referred to the use of wires W' W'; but it is obvious that cords or twines may be used in lieu thereof, if desired.

Having described my invention, I claim—

1. The combination, with a support for a series of heddle-eyes and supports for side bars, of devices for separating the first of said eyes from the rest thereof, and devices for engaging in the space between the separated first and second eyes with wires threaded through the end openings in the said heddle-eyes and carrying loops thereof out and around the ends of the side bars, substantially as described.

2. The combination, with a support for a series of heddle-eyes and supports for side bars, of devices for separating the first of said eyes from the rest thereof, devices for engaging in the space between the first and second eyes with wires threaded through the end openings in the said heddle-eyes and carrying loops thereof out and around the ends of the side bars, and means for drawing along the outer edges of the side bars ropes around which and the side bars the wire loops have been laid, substantaially as described.

3. The combination, with a support for a series of heddle-eyes and supports for side bars, of devices for separating the first of said eyes from the rest thereof, hooks for engaging in the space opened between the separated first and second heddle-eyes with wires threaded through end openings in the heddle-eyes, means for actuating the said hooks to reciprocate them toward and from the sides of the machine, side hooks, and means for actuating the side hooks to cause them to carry over the ends of the side bars the loops drawn out by the hooks first mentioned, substantially as described.

4. The combination, with a support for a series of heddle-eyes and supports for side bars, of devices for separating the first of said eyes from the rest thereof, hooks for engaging in the space opened between the separated first and second heddle-eyes with wires threaded through end openings in the heddle-eyes, means for actuating the said hooks to reciprocate them toward and from the sides of the machine, side hooks, means for actuating the side hooks to cause them to carry over the ends of the side bars the loops drawn out by the hooks first mentioned, and means for drawing along the outer edges of the side bars ropes around which and the side bars the wire loops have been laid, substantially as described.

5. The combination, with the stop against which may come to rest the first of a series of heddle-eyes, of a separator for opening a space between the first heddle-eye and the rest of the heddle-eyes, means for operating said stop and separator in alternate succession, supports for side bars, and devices for engaging in the space between the separated first and second eyes with wires threaded through the end openings in the said heddle-eyes and carrying loops thereof out and around the ends of the side bars, substantially as described.

6. The combination, with the stop against which may come to rest the first of a series of heddle-eyes, of a separator for opening a space between the first heddle-eye and the rest of the heddle-eyes, means for operating said stop and separator in alternate succession, supports for side bars, devices for engaging in the space between the separated first and second eyes with wires threaded through the end openings in the said heddle-eyes and carrying loops thereof out and around the ends of the side bars, and means for drawing along the outer edges of the side bars ropes around which and the side bars the wire loops have been laid, substantially as described.

7. The combination, with a stop against which may come to rest the first of a series of heddle-eyes, of a separator for opening a space between the first heddle-eye and the rest of the heddle-eyes, means for operating said stop and separator in alternate succession, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, and means for actuating the last-mentioned hooks, substantially as described.

8. The combination, with a stop against which may come to rest the first of a series of heddle-eyes, of a separator for opening a space between the first heddle-eye and the rest of the heddle-eyes, means for operating said stop and separator in alternate succession, hooks for engaging in the space opened between the first and second heddle-eyes with wires strung through the end openings of the heddle eyes, means for reciprocating the said hooks toward and from the sides of the machine, supports for side bars, hooks for engaging the loops drawn out to the sides of the machine and placing them around the ends of the side bars, means for actuating the said last-mentioned hooks, and means for drawing along the outer edges of the side bars ropes around which and the side bars the wire loops have been laid, substantially as described.

9. The combination, with a stop against which may come to rest the first of a series of heddle-eyes, of a separator for opening a space between the first heddle-eye and the rest of the heddle-eyes, means for operating said stop and separator in alternate succession, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the last-mentioned hooks, a carriage adapted for having connected thereto ropes passing through or around the rear ends of the side bars and along the outer edges of said bars, and means for traversing the said carriage, substantially as described.

10. The combination, with the stop against which may come to rest the first of a series of heddle-eyes, of a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating said second separator or withdrawing device, supports for side bars, and devices for engaging in the space between the separated first and second eyes with wires threaded through the end openings in the said heddle-eyes and carrying loops thereof out and around the ends of the side bars, substantially as described.

11. The combination, with the stop against which may come to rest the first of a series of heddle-eyes, of a separator for opening a space between the first heddle-eye and the rest of the heddle-eyes, means for operating said stop and separator in alternate succession, devices for engaging with the first heddle-eye and withdrawing it from the immediate neighborhood of the stop and separator first mentioned, means for actuating said second separator or withdrawing device, supports for side bars, devices for engaging in the space between the separated first and second eyes with wires threaded through the end openings in the said heddle-eyes and carrying loops thereof out and around the ends of the side bars, and means for drawing along the outer edges of the side bars ropes around which and the side bars the wire loops have been laid, substantially as described.

12. The combination, with a stop against which may come to rest the first of a series of heddle-eyes, of a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating the said second separator or withdrawing device, hooks for engaging in the space between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, and means for actuating the said last-mentioned hooks, substantially as described.

13. The combination, with a stop against which may come to rest the first of a series of heddle-eyes, of a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating the second separator or withdrawing device, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the said last-mentioned hooks, and means for drawing along the outer edges of the side bars ropes around which and the side bars the wire loops have been laid, substantially as described.

14. The combination, with a stop against which may come to rest the first of a series of heddle-eyes, of a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating said second separator or withdrawing device, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the said last-mentioned hooks, a carriage adapted for having connected thereto ropes passing through or around the rear ends of the side bars and along the outer edges of said bars, and means for traversing the said carriage, substantially as described.

15. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, and means for actuating the last-mentioned hooks, all substantially as described.

16. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the said last-mentioned hooks, and means for drawing along the outer edges of the side bars ropes around which and the side bars the wire loops have been laid, substantially as described.

17. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, hooks for engaging in the space opened between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the last-mentioned hooks, a carriage adapted for having connected thereto ropes passing through or around the rear ends of the side bars and along the outer edges of said bars, and means for traversing the said carriage, substantially as described.

18. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating said second separator or withdrawing device, hooks for engaging in the space between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, and means for actuating the said last-mentioned hooks, substantially as described.

19. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating the second separator or withdrawing device, hooks for engaging in the space between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the said last-mentioned hooks, and means for drawing along the outer edges of the side bars ropes around which and the side bars the wire loops have been laid, substantially as described.

20. The combination, with a rod on which heddle-eyes may be strung, a guide for the collection of heddle-eyes strung on the said rod, and means for impelling the heddle-eyes forward in the said guide, of a stop for engaging with the first or front heddle-eye and arresting the forward movement of the heddle-eyes, a separator for opening a space between the first heddle-eye and the rest of the heddle-eyes, means for operating said stop and separator in alternate succession, a second separator or withdrawing device for engaging with the first heddle-eye and withdrawing it from the immediate neighborhood of the stop and separator first mentioned, means for actuating said second separator or withdrawing device, hooks for engaging in the space between the first and second heddle-eyes with wires strung through the end openings of the heddle-eyes, means for reciprocating the said hooks toward and from the sides of the machine, supports for side bars, hooks for engaging the loops drawn out to the sides of the machine and placing them around the ends of the side bars, means for actuating the said last-mentioned hooks, a carriage adapted for having connected thereto ropes passing through or around the rear ends of the side bars and along the outer edges of said bars, and means for traversing the said carriage, substantially as described.

21. The combination of a hook, a slide on which the same is mounted, a lever pivoted to the said slide, and a fixed stop for engaging with said lever, with means for reciprocating the said slide, substantially as described.

22. The combination, with the side hook $h$, the slide on which the said hook is mounted, and the lever pivoted on the said slide, of the fixed stop $V'''$, the spring $V''$, the arm $y'$, and the vibrating arm $V'$, substantially as described.

23. The combination, with the rollers R, their supporting-shaft, the pulley on said shaft, and the carriage C, of the cord O, passing around the said pulley and connected to said carriage, substantially as described.

Signed at Boston, in the county of Suffolk and State of Massachusetts, this 11th day of July, A. D. 1888.

CALVIN P. LADD.

Witnesses:
LOUIS PAPANTI,
JAMES P. MCLEAN.